(12) United States Patent
Mittal et al.

(10) Patent No.: US 8,296,497 B2
(45) Date of Patent: Oct. 23, 2012

(54) SELF-UPDATING MEMORY CONTROLLER

(75) Inventors: Alok Kumar Mittal, Delhi (IN); Hubert Rousseau, Marseilles (FR); Rosarium Pila, Uttar Pradesh (IN)

(73) Assignees: STMicroelectronics PVT. Ltd., Uttar Pradesh (IN); STMicroelectronics S.A., Montrouge (FR)

( * ) Notice: Subject to any disclaimer, the term of this patent is extended or adjusted under 35 U.S.C. 154(b) by 294 days.

(21) Appl. No.: 11/724,046

(22) Filed: Mar. 14, 2007

(65) Prior Publication Data

US 2008/0059690 A1 Mar. 6, 2008

(30) Foreign Application Priority Data

Mar. 14, 2006 (IN) ................................ 689/Del/2006

(51) Int. Cl.
*G06F 12/00* (2006.01)
(52) U.S. Cl. ........................................ 711/103; 711/154
(58) Field of Classification Search ................. 711/104, 711/156, 103, 154
See application file for complete search history.

(56) References Cited

U.S. PATENT DOCUMENTS

| | | |
|---|---|---|
| 6,097,666 A | 8/2000 | Sakui et al. |
| 6,400,624 B1 | 6/2002 | Parker et al. |
| 6,424,569 B1 | 7/2002 | Parker et al. |
| 6,446,177 B1 | 9/2002 | Tanaka et al. |
| 6,507,514 B1 | 1/2003 | Tsao et al. |
| 6,591,330 B2 | 7/2003 | Lasser |
| 6,629,224 B1 | 9/2003 | Suzuki et al. |
| 6,724,682 B2 | 4/2004 | Lee et al. |
| 6,754,894 B1 | 6/2004 | Costello et al. |
| 7,120,729 B2 * | 10/2006 | Gonzalez et al. ............. 711/103 |
| 2004/0228161 A1* | 11/2004 | Mori et al. .................... 365/154 |
| 2006/0250720 A1* | 11/2006 | Hsu et al. ........................ 360/46 |

* cited by examiner

*Primary Examiner* — Matthew Bradley

(57) ABSTRACT

A system and method of making a firmware self updatable depending on option information stored in a configuration module. The configuration module can either be in a memory device or a memory controller. The self-updation flexibility can be achieved by customizing the options as per the customer's requirements and can be done either through an USB interface or by pre-programming the configuration module or any other communication or programming options. The option information is provided by using a configurable module inside either the memory or the memory controller. After the basic initialization operations, the firmware reads the option information from the controller itself or any other non-volatile memory and performs the tasks to enhance the overall performance.

20 Claims, 2 Drawing Sheets

SELF-UPDATING MEMORY CONTROLLER

CROSS-REFERENCE TO RELATED APPLICATIONS

This patent application claims priority under 35 U.S.C. §119(a) to Indian Patent Application No. 689/Del/2006 entitled "SYSTEM AND METHOD FOR NAND CONTROLLER UPDATION" filed on Mar. 14, 2006, which is hereby incorporated by reference. Indian Patent Application No. 689/Del/2006 is assigned to the assignee of the present application and is hereby incorporated by reference into the present disclosure as if fully set forth herein. The present application hereby claims priority under 35 U.S.C. §119(a) to Indian Patent Application No. 689/Del/2006.

TECHNICAL FIELD

The present disclosure relates to semiconductor memory devices and more specifically to systems and methods for self updating or self-updation of memory controllers to enhance memory performance.

BACKGROUND

Semiconductor memory devices have undergone various design changes in terms of package density, operating speed, or power/current dissipation. Different types of non-volatile memory devices have been developed to store information. Non-volatile memory retains stored data even after the power is removed from the device. A memory device should have an increased storage density with reduced read and write durations.

Flash memory cells can be classified into NAND type, NOR type, AG-AND (Assist Gate-AND) type. The NAND flash memory cells are useful in large scale integration. The NOR flash memory cells include cell transistors that are connected in parallel between bit lines and ground lines. The NOR flash memory cells provide high-speed of operations. The AND type flash memory is advantageous for its high speed writing (10 megabytes per second) and large volume storage capacity (4 GB), smaller chip size (memory cell area of 0.016 micro sq. meter).

As NAND flash memory cells can be easily integrated and made at a low cost, it is advantageous to apply NAND-type flash memories to a large scale supplementary memory device. These days various NAND-type flash memories are provided with various functional options to comply with the various requirements.

U.S. Pat. No. 6,097,666 discloses a method to provide a memory capability of reducing erase time, write time and test time without raising the chip cost and making the address inputting operation complicated. Another object of this present disclosure is to provide a semiconductor memory device capable of freely setting the size of a selected block and selectively affecting the erase, write and test operations with respect to a plurality of blocks. Therefore, this method provides a technique for selecting multiple blocks for different operations. However, it does not provide options for selection of commands to enhance the performance of memory. Moreover, the patent is on memory device and not on the controller.

U.S. Pat. No. 6,400,624 discloses a method for testing a multi-level memory. This includes storing multi-level data in a plurality of memory cells of the multi-level memory and reading from configure registers initial values of a plurality of performance variables. The performance variables set operating parameters of the multi-level memory. This method is therefore a technique for comparing the reference stored in the configuration registers for finding the performance.

U.S. Pat. No. 6,446,177 discloses a memory system using semiconductor memory to be used for the purpose of protecting copyrights. This also relates to a control method of electrically erasable and programmable nonvolatile semiconductor memory, especially useful for use to NAND EEPROM (Electrically Erasable and Programmable Read-Only Memory). Thus, this reference discloses a method of copyright protection by identification.

U.S. Pat. No. 6,629,224 relates to a method for operating a semiconductor memory device having a plurality of operating modes. Commands are accepted twice by a semiconductor memory device. The number of operating modes is narrowed down by the first command. At this time, a part of the circuit necessary for performing a predetermined operating mode among the narrowed operating modes is operated. Then, an operating mode is determined by the second command. When the operating mode is a predetermined operating mode, the remainder of the circuit is operated. This method reduces the terminals for inputting the commands and addresses.

U.S. Pat. No. 6,591,330 relates to a system and method for handling data storage on a plurality of different types of flash devices. More particularly, to a system and method which manage the storage and retrieval of information on flash devices having different sizes of erasable units and/or read/write units, enabling them to behave as flash disks. Therefore, this method discloses the controller system capable of the flash/memory controller with selectable different size of the read/write units. However, this method does not address the usage of different options available inside the NAND itself for same function of read/write/copy.

U.S. Pat. No. 6,424,569 discloses a technique for selectable option, added to a memory cell, such as a multilevel NAND flash cell, that allows the user to select whether to optimize the programming time or the data integrity. A mode selection mechanism can switch the programming mode of each cell. A first programming mode programs the cell with a first programming voltage and maintains at least fifty percent of the maximum data margin. A second programming mode programs the cell with a second programming voltage and maintains at least eighty five percent of the maximum data margin. Thus, this method provides a selectable programming time, however does not provide for user selectable commands of memory.

U.S. Pat. No. 6,507,514 relates to an integrated circuit chip suitable for use in either a single chip packaged configuration or a multi-chip packaged configuration. The chip has a conventional memory circuit portion and a control circuit portion.

U.S. Pat. No. 6,724,682 discloses a NAND type flash memory device that can properly operate in response to a user's requirements to page sizes and block sizes, and have various multiple speeds of operation mode according to options. The structure and operation method of a NAND type flash memory device having two or more page sizes and block sizes is also provided.

U.S. Pat. No. 6,754,894 discloses a wireless information delivery system for delivering software and operating parameter updates to receivers in a broadcast information delivery system. Executable software programs and related operating parameters are changed in a mobile electronic device that is associated with an information delivery system by broadcasting a wireless (e.g., radio) signal containing multiple copies of new data. The mobile device uses the new data to update or to change its software or operating parameters. The number of copies (repetitions) of the new data that are broadcast depends on the expected reception error rate and on the desired probability that the receiver will receive the new data without error. Thus, this method discloses multiple-delivery of the new data to the mobile system for increasing the probability of reception depending on the expected errors.

The prior art discussed above does not overcome all the problems encountered in the field. One of the major problems encountered is the lack of options for selection of commands, which is very pertinent in enhancing the performance of a memory.

There is therefore a need for systems and methods for self-updating memory controllers, such as a NAND controller, a NOR controller, a Micro Controller Unit (MCU), a Micro Processor Unit (MPU), that result in an enhanced memory performance.

SUMMARY

It is an object of the present disclosure to provide a system having a memory controller for processing multiple option information for updating the memory controller according to user inputs.

In one embodiment, the present disclosure provides a memory controller. The memory controller could include a memory device to perform a plurality of operations. The memory controller could also include a configuration module to store option information associated with the plurality of operations. The memory controller could further include a circuit to update the memory controller according to the operation performed by the memory device and the associated option information.

In another embodiment, the present disclosure provides a system having a NAND controller with a plurality of operating modes for executing a plurality of commands for self-updation. The system could include a memory device providing one or more of reading operations, writing operations and copying operations. The system could also include a configuration module to store a plurality of option information. The system could further include a circuit to connect the at least one memory device with the NAND controller for initializing the system.

In still another embodiment, the present disclosure provides a method of self-updating a memory controller having a plurality of operating modes for executing commands for the self-updation. The method could include configuring the memory controller with at least one memory device. The method could also include fetching option information to store in a configuration module. The method could further include processing the option information to update the memory controller.

Other technical features may be readily apparent to one skilled in the art from the following figures, descriptions and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

The present disclosure provides a system and method for a self-updating memory controller and a system and method for self-updation of firmware associated with the memory controller depending on the option information stored in the configuration module. Generally, this flexibility can be achieved by customizing the option information as per the customer's requirements and could be done either through a Universal Serial Bus (USB) interface or by pre-programming the configuration module contents.

Figure 1:
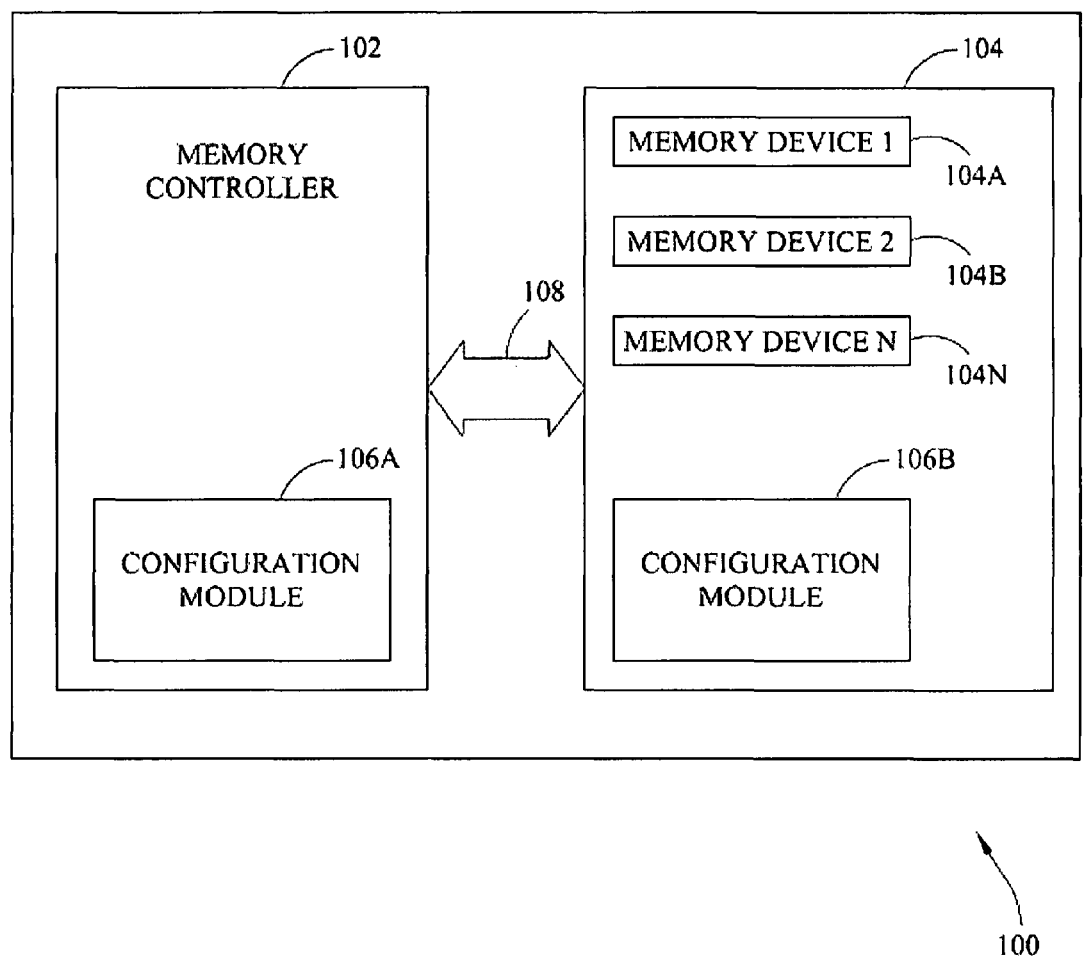
FIG. 1 illustrates a block diagram of a system having a memory controller according to one embodiment of the present disclosure.

FIG. 1 illustrates a block diagram of a system 100 according to the present disclosure. The embodiment of the system 100 shown in FIG. 1 is for illustration purposes only and is not drawn to scale. Other embodiments of the system 100 may be used without departing from the scope of this disclosure.

The system 100 includes a memory controller 102, a memory device 104 and one or more configuration modules, such as 106A and 106B. Examples of the memory controller 102 could include, for example, a NAND controller, a Micro Controller Unit (MCU), a Micro Processor Unit (MPU), a volatile memory controller, and/or a non-volatile memory controller. The memory device 104 includes multiple memory devices, such as, 104A, 104B till 104N, and the configuration module 106B.

The memory controller 102 has multiple operating modes for fetching multiple commands and running the system 100. The memory controller 102 includes the configuration module 106A. The memory device 104 provides storage of data and could perform different operations such as, for example, reading, writing and copying operations within the system 100. The configuration module 106A and 106B stores option information. The configuration module 106A and 106B could be a RAM variable, a volatile variable, and/or a non-volatile variable. The interface 108 connects the memory device 104 to the memory controller 102. The interface 108 can be a serial interface or a parallel interface or a memory dependent interface.

Examples of the memory device 104 could include, but are not limited to, a NAND flash memory, a NOR flash memory, and any other non-volatile memory. The configuration module 106 is a flag. The flag is like a switch that can be either in "ON" state or in "OFF" state. The flag stores a binary value or a code that has an assigned meaning. One of the uses of the flag is to mark or designate data structures for future processing. In one embodiment of the present disclosure, the length of a flag could be 4 bytes, which is represented as a Customer Option[n]. Each bit of the flag is used for customising the memory controller 102 by enabling or disabling a feature of the memory controller 102.

The customer option bytes or option information are stored in the memory controller 102. After performing basic operations such as, for example, a normal read, the firmware reads the option information from the memory controller 102 and performs the additional tasks to enhance the overall speed. An illustration of an embodiment of the option implementation is provided below:

TABLE 1

Customer Option [0]: Capacity Reduction,
Block Pointer, Cache Read

| Customer Option[0] | NAND Features |
|---|---|
| 0x01 | Capacity Reduction |
| 0x02 | Block Pointer |

TABLE 1-continued

Customer Option [0]: Capacity Reduction,
Block Pointer, Cache Read

| Customer Option[0] | NAND Features |
|---|---|
| 0x04 | Cache Read algorithm with No Second Read-Cache command |
| 0x08 | Cache Read algorithm with Second Read-Cache command |

The above table describes a Customer Option byte. This byte is used for controlling various NAND features. For example, 0x01 makes the firmware to have the Capacity Reduction facility to reduce the flash memory size to 90%, 50%, etc. This Capacity Reduction facility is useful because with time, bad blocks of the NAND gradually increase. The NAND becomes useless after having a certain limit of bad blocks. In this case, with the help of this feature, we can have the facility to access the NAND with its 90% or 50% of total memory capacity. This is just an embodiment of the memory reduction. Any feature can be used for the particular bit.

If this byte is programmed as 0x08 then the firmware will support the Cache Read feature for issuing a second Read-cache command. This feature is sometimes referred to as Toshiba MLC NAND. Similarly, if the byte is programmed as 0x04, it will support the Cache Read feature for not issuing a second Read-cache command. If the byte is programmed as 0x02, it adds the block pointer feature which helps in pointing next block address which is to be processed. Thus, it becomes optional to use these features. In one embodiment, the present disclosure provides a method that could aid in future upgrades of the NAND flash controller supported by either enabling or disabling the NAND feature.

In one embodiment, a technique according to the present disclosure could be used in mass-storage systems to customize the firmware with various memory controller features. The customer option bytes are stored in the memory controller itself and are retrieved as per the customer requirements.

Figure 2:
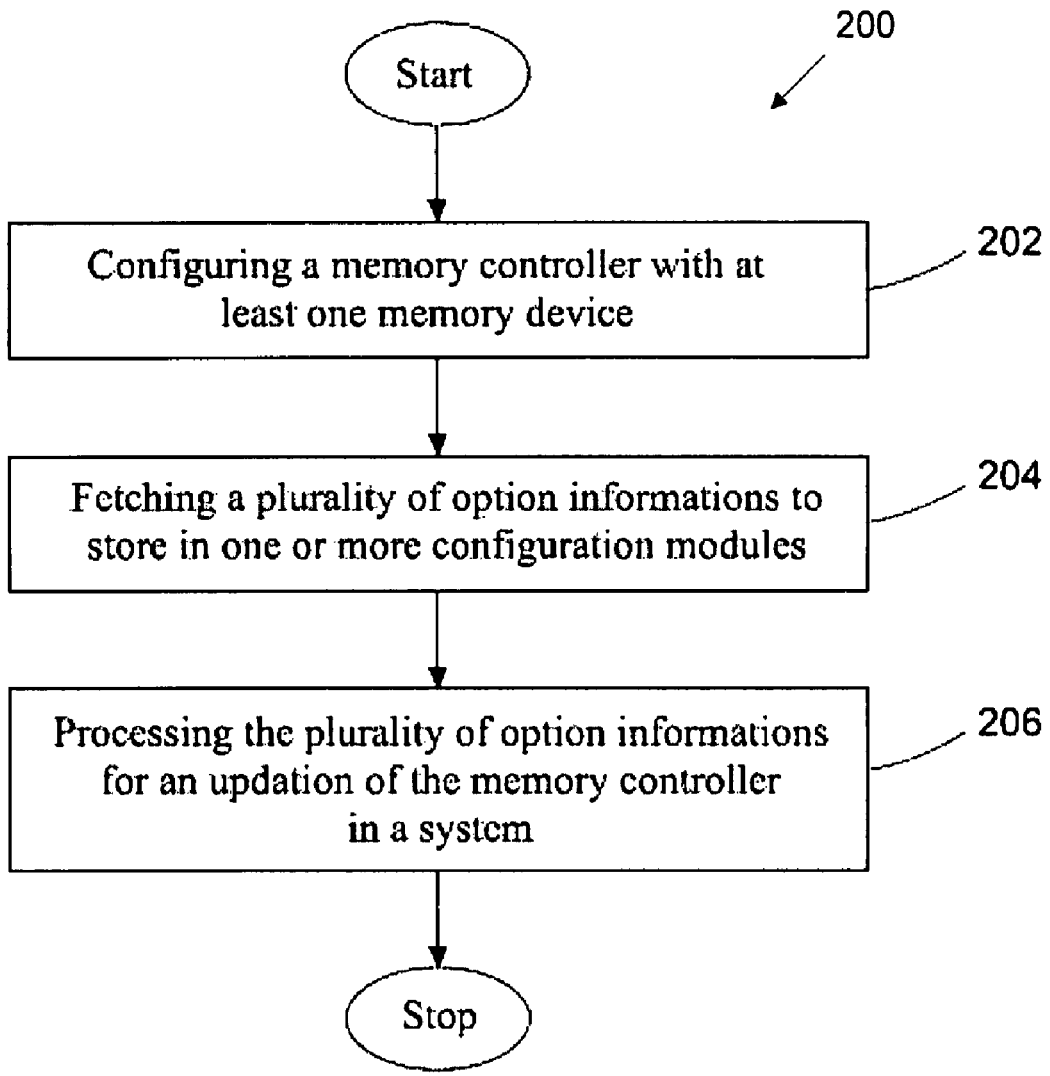
FIG. 2 illustrates a somewhat simplified flow diagram illustrating a method for self-updating a memory controller according to one embodiment of the present disclosure.

FIG. 2 illustrates a somewhat simplified flow diagram illustrating an exemplary method for self-updation of a memory controller in a system according to one embodiment of the present disclosure. The embodiment of the method 200 illustrated in FIG. 2 is for illustration purposes only. Other embodiments of the method 200 may be used without departing from the scope of this disclosure.

At step 202, a memory controller is configured with at least one memory device. At step 204, multiple option information are fetched to store in one or more configuration modules. At step 206, the multiple option information are processed for updating the memory controller in the system.

The technique described here can also be used for eliminating the firmware bugs in the algorithms used, as many options are available. However, the basic options shall be functional when a bug is detected in an "enhanced option". For example, if a bug is detected in an internal copy-back operation of the memory, this option can be switched off by putting the right configuration bit in the option bytes. Thus, the copy-back operation can then be performed by a read and write mechanism. Similarly, if a firmware bug is detected in the cache-read algorithm of the controller, this can be eliminated by switching it off. Another aspect of the present disclosure is that the same controller system can be used with different memories having the same or different internal commands. So if a memory is used for making a mass-storage device which do not have the write-cache option, the suitable bit in the NAND data option can be reset so that the controller do not perform the write-cache operation on the NAND, whereas, it can perform this operation when a memory is available with internal operation. The option bit enabling and disabling can be done by the customer using the Universal Serial Bus (USB) interface or any other interface. The configuration module can also be pre-programmed before connecting to the controller to enable or disable a particular feature to be supported or not.

Embodiments of the present disclosure offer many advantages. For example, some embodiments allow the customer to customize the system by enabling or disabling the flag which helps in incorporating and executing additional functions and thereby self updating the memory controller in the system. As another example, some embodiments provide flexibility for eliminating the firmware bugs in the algorithms by switching off such operation. As still another example, the same controller system could be used with different memories having the same or different internal commands. In addition, the memory could also be pre-programmed before connecting to the controller to enable or disable a particular feature.

Accordingly, some embodiments of the present disclosure provide a memory controller which can be used with different memories having the same or different internal commands. In addition, some embodiments provide a system and method for implementing a firmware complied with various features of NAND specifications. For example, a cache read is an additional feature of a read operation of some of the NAND samples. To add this feature in the firmware, an option flag has been fixed, which will allow a customer to use this feature or not. Customer option bytes are stored in the NAND. After the basic operations, like normal read is performed, the firmware reads the customer options from the NAND itself and performs the additional tasks to enhance the overall speed. This technique is very customer friendly.

Embodiments of the present disclosure could be used to eliminate firmware bugs in the algorithms used since many options are available. However, the basic options shall be functional when a bug is detected in the "enhanced option" For example if a bug is detected in internal copy-back operation of the memory, this option can be switched off by putting the right configuration bit in the option bytes. Thus, the copy-back operation could then be performed by read and write mechanism. Similarly, if a firmware bug is detected in the cache-read algorithm of the controller, this can be eliminated by switching it off.

Some embodiments of the present disclosure provide a controller system that can be used with different memories having the same or different internal commands. For example, if a memory is used for making a mass-storage device, which does not have the write-cache option, the suitable bit in the "NAND data option" can be reset so that the controller do not perform the write-cache operation on the NAND, whereas it can perform this operation when a memory is available with internal operation.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A memory controller, comprising:
a configuration module configured to store multiple option information for at least one memory device, the multiple option information comprising information specifying one of a capacity reduction and activation of additional processing relating to an access of the at least one memory device performed following completion of a basic operation for the access of the memory device,
wherein the additional processing is enabled or disabled based upon a detected access of the at least one memory device.

2. The memory controller of claim 1, wherein the memory controller is at least one of: a NAND controller, a microcontroller unit (MCU), a microprocessor unit (MPU), a volatile memory controller and a non volatile memory controller.

3. The memory controller of claim 1, wherein the memory device is at least one of: a NAND flash memory, a NOR flash memory, a volatile memory and a non-volatile memory.

4. The memory controller of claim 1, wherein the additional processing is enabled or disabled based upon a bug detected in firmware associated with the at least one memory device.

5. The memory controller of claim 1, wherein the multiple option information configures the at least one memory device to perform at least one of: issuing a second cache read command, using a block address pointer, using a write-cache option copy-back operation.

6. The memory controller of claim 1, wherein the additional processing updates a feature of firmware associated with the at least one memory device.

7. The memory controller of claim 1, wherein the basic operation comprises at least one of: a reading operation, a writing operation, and a copying operation.

8. The memory controller of claim 1, wherein the configuration module comprises programmable circuitry.

9. A system having a memory controller with a plurality of operating modes for executing a plurality of commands for self-updating, the system comprising:
at least one memory device configured to provide data responsive to one or more of reading operations, writing operations and copying operations; and
a configuration module configured to store multiple option information for the at least one memory device, the multiple option information comprising information specifying one of a capacity reduction and activation of additional processing relating to an access of the at least one memory device performed following completion of a basis operation for access of the at least one memory device by the reading operations, writing operations and copying operations, wherein the additional processing is enabled or disabled based upon a detected access of the at least one memory device.

10. The system of claim 9, wherein the at least one memory device is selected from a group comprising: a NAND flash memory, a NOR flash memory, a volatile memory and a non-volatile memory.

11. The system of claim 9, wherein the additional processing is enabled or disabled based upon a bug detected in firmware associated with the at least one memory device.

12. The system of claim 9, wherein the multiple option information configures the at least one memory device to perform at least one of: issuing a second cache read command, using a block address pointer, using a write-cache option, and switching off an internal copy-back operation.

13. The system of claim 9, wherein the additional processing updates a feature of firmware associated with the at least one memory device.

14. The system of claim 9, wherein the configuration module comprises programmable circuitry.

15. A method of self-updating a memory controller having a plurality of operating modes for executing commands for the self-updating, the method comprising:
fetching multiple option information for at least one memory device, the multiple option information comprising information specifying one of a capacity reduction and activation of additional processing relating to an access of the at least one memory device performed following completion of a basic operation for the access of the memory device;
detecting an access of the at least one memory device; and
enabling or disabling the additional processing based upon a detected access of the at least one memory device.

16. The method of claim 15, wherein the memory controller is at least one of: a NAND controller, a microcontroller unit (MCU), a microprocessor unit (MPU), a volatile memory controller and a non volatile memory controller.

17. The method of claim 15, wherein the at least one memory device is at least one of: a NAND flash memory, a NOR flash memory, a volatile memory and a non-volatile memory.

18. The method of claim 15, wherein the multiple option information configures the at least one memory device to perform at least one of: issuing a second cache read command, using a block address pointer, using a write-cache option, and switching off an internal copy-back operation.

19. The method of claim 15, further comprising updating firmware associated with the at least one memory device.

20. The method of claim 15, wherein the basic operation comprises at least one of: a reading operation, a writing operation, and a copying operation.

* * * * *